United States Patent [19]

Bell, Jr. et al.

[11] 4,258,243
[45] Mar. 24, 1981

[54] OVER CURRENT PROTECTION SYSTEM FOR ELECTRICAL DISCHARGE MACHINING APPARATUS

[75] Inventors: Oliver A. Bell, Jr., Statesville; Randall C. Gilleland, Troutman; Davey J. Chance, Concord, all of N.C.

[73] Assignee: Colt Industries Operating Corp., New York, N.Y.

[21] Appl. No.: 23,633

[22] Filed: Mar. 26, 1979

[51] Int. Cl.$^3$ .................................................. B23P 1/02
[52] U.S. Cl. .............................. 219/69 S; 219/69 M; 219/69 C
[58] Field of Search .................. 219/69 S, 69 C, 69 P, 219/69 M

[56] References Cited

U.S. PATENT DOCUMENTS

| | | | |
|---|---|---|---|
| 3,558,998 | 1/1971 | Bertolasi | 219/69 C |
| 3,623,148 | 11/1971 | Berghausen | 219/69 C |
| 3,627,968 | 12/1971 | Sennowitz | 219/69 C |
| 3,737,615 | 6/1973 | Bell, Jr. | 219/69 C |
| 3,805,012 | 4/1974 | Bell, Jr. et al. | 219/69 S |

*Primary Examiner*—C. C. Shaw
*Attorney, Agent, or Firm*—Harry R. Dumont

[57] ABSTRACT

The system responds to the frequency of pulses from the pulse generator or multivibrator. As the frequency of the pulses increases, they get closer together and the average voltage changes in a somewhat linear fashion. A final integrator amplifier stage is used to find the predetermined maximum current level for different frequency settings. Responsive to this level being exceeded, machining power is interrupted and the EDM operation interrupted.

14 Claims, 1 Drawing Figure

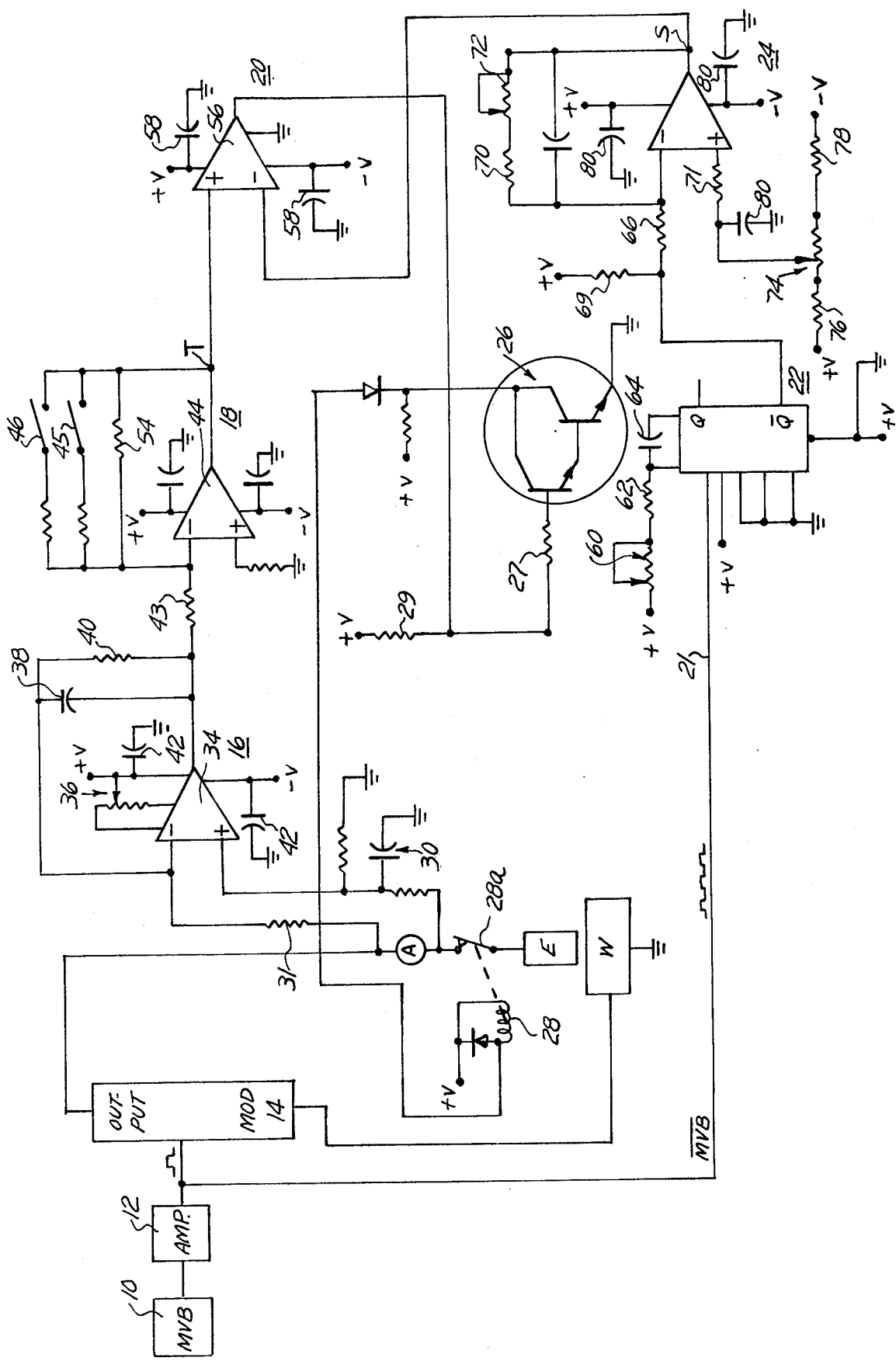

OVER CURRENT PROTECTION SYSTEM FOR ELECTRICAL DISCHARGE MACHINING APPARATUS

BACKGROUND OF THE INVENTION

The field to which our invention relates is that known as electrical discharge machining, hereinafter referred to as "EDM" in which material is removed from an electrically conductive workpiece by the action of electrical gap discharges between an electrode and the workpiece. For the process to operate, it is necessary that the workpiece be electrically conductive. A servo feed system is used to provide relative movement between electrode and workpiece during machining thus to maintain a relatively constant and optimum gap spacing as material is progressively removed from the workpiece.

A dielectric fluid is circulated and recirculated generally under pressure through the gap throughout the machining operation. For most reliable results, a power supply of the independent pulse generator type is utilized to provide machining power pulses of precisely controllable frequency and duty factor. A multivibrator particularly suitable for use as the pulse generator in an EDM power supply is described and shown in Bell, U.S. Pat. No. 3,809,848, issued on May 7, 1974, for "Digitally Controlled Power Supply for Electrical Discharge Machining Apparatus". This patent is of common ownership with the present application.

Various over current protection systems have been disclosed in the prior art which generally sense the gap condition and in response to a condition approaching gap short circuit either the D.C. power source for the EDM circuit or, in some cases, the multivibrator producing the machining power pulses is cut off.

It is a considerable problem, particularly as at higher frequencies to determine whether a danger point is being approached and at that point interrupt the machining operation. Prior arrangements have been to limit the current to the gap by automatically adjusting it for each preselected frequency and current magnitude combination. One such system of this type is described in Bell, U.S. Pat. No. 3,737,615, issued on June 5, 1973, for "Current and Frequency Control System for Electrical Discharge Machining". Most prior art over current protection systems simply measure and respond to average gap voltage and responsive to voltage drop below a predetermined level, the EDM machining is interrupted. A system of this type is shown in Bell, U.S. Pat. No. 3,746,826, issued on July 17, 1973, for "Short Circuit Protection System for Electrical Discharge Machining".

SUMMARY OF THE PRESENT INVENTION

The present invention will thus be seen to relate to a system in which as average current is increased, the average voltage rises, and it is a linear type rise. Included in the over current protection circuit is an integrator with a voltage output that increases as a function of the frequency of machining power pulses being used. This output is passed through a level comparator which above a predetermined safe level will provide a cutoff signal to interrupt power to the gap. Thus the circuit, according to our invention, is one which operates in advance of actual damage occurring.

BRIEF DESCRIPTION OF THE DRAWINGS

Reference is now made to the accompanying drawing for a description of the circuit and system incorporating the present invention with like numerals used to identify like parts as they may appear. The drawing is a combined schematic and block diagrammatic showing of an electrical discharge machining power supply and protection system.

DETAILED DESCRIPTION OF THE PREFERRED EMBODIMENT

The basic elements of the EDM power supply will be seen to include a multivibrator 10, following amplifier and pulse shaping network 12, and an output module 14 which has its output leads connected to the machining gap which includes an electrode E and workpiece W. The power output module 14, as is well known in the art, includes one or more electronic switches and a D.C. power source operatively connected to the gap so that, in response to triggering pulses from the multivibrator, erosive machining power pulses will be passed across the gap.

Reference is now made to the several operating stages of the over current protection system itself. These include integrator amplifier stage 16, gain adjust stage 18, and a level comparator stage 20. A second input lead 21 is coupled to the output of the amplifier 12 in the power supply. The $\overline{\text{MVB}}$ signal is passed to a monostable multivibrator stage 22, to an integrator amplifier stage 24 and finally as a second input to the level comparator stage 20. A control output is provided from the level comparator 20 to trigger drive transistor pair 26 into conduction thus to control the operation of a relay 28. A suitable bias voltage is connected to the transistor base through a resistor 27 and a resistor 29. The relay 28 has its movable contact 28a in series with the electrode E and the output module 14 of the power supply circuit and responsive to its actuation, the contact 28a will be opened.

It will be seen that the stages of the monostable multivibrator 22 and the integrator amplifier 24 performs a frequency to voltage conversion. This circuit is preadjusted in one example such that the output from the integrator amplifier 24 at point S will be a −7.69 volts with a 500 HZ output from the multivibrator and a −0.769 volts at 250 KHZ. Thus with an input of 333 KHZ, the output is −0.35 volts. These levels are thus used to predetermine the current trip point at any given frequency in the normal operating range from 500 HZ to 333 KHZ. The voltage output from the integrator amplifier is fed to the level comparator stage 20 to control its operation and the actual disconnect function performed through the transistors 26.

The initial input signal from the circuit is preferably taken from a shunt circuit which for convenience may be derived from the ammeter for measuring gap current used in the EDM operation. The drawing shows the input being taken across the ammeter A. The input passes through a pulse shaping network 20 of the RC type. A resistor 31 is included in series with the negative input terminal of the amplifier 34. The integrator amplifier stage 16 has associated with it an amplifier 34, a potentiometer 36, and a plus and minus voltage source for operating the amplifier 34. A further integrating network including a capacitor 38 and a resistor 40 is connected in circuit as shown. Ground connections are made in the circuit through capacitors 42 where required. The function of integrator amplifier stage 16 is to convert the current passing through the gap and sensed through the ammeter shunt into voltage pulses which it then averages and amplifies to a level representative of average gap current. In one exemplary embodiment, the ammeter shunt used is such that 91.7 millivolts across the shunt corresponds to the trip current magnitude at 500 HZ. The output of the integrator amplifier stage 16 passes through a series resistor 43 to a following gain adjustment portion of the circuit associated with the gain adjust stage 18. Included in it is an amplifier 44. Suitable plus and minus voltage sources are attached to the amplifier 44 for operating it. The gain adjustment circuit includes switches 46, 48 and associated resistors 50, 52, and 54. As more current capability is added to the power supply, for example by switching an additional output module 14 into the circuit, the gain of the amplifier 44 is reduced to maintain proper signal output level at point T. For example, a typical power supply may have four modules of 55 amperes each. With one module in circuit, both switches 46 and 48 would be relay operated or manually operated open and the gain is set by resistors 42 and 54 at a gain of four. With two modules in circuit, switch 46 is closed and switch 48 is open and the gain of two is set by resistors 42, 50, and 54. In a similar manner, with three modules in circuit, switch 46 is open and switch 48 is closed. This sets the gain at 1.33 by resistors 42, 52, and 54. With four modules in circuit, both switches 46 and 48 are closed thus setting the gain at one by resistors 42, 50, 52 and 54.

The next following level comparator stage 20 includes an amplifier 56 having appropriate plus and minus voltage sources connected to it for operating it and capacitors 58 connected to ground as shown. It is the function of this stage to compare the voltage signal at point T to a further voltage signal to determine whether protective circuit action is required. A second voltage signal at the minus input terminal of the amplifier 56 is derived from the other input circuit which includes at its left-hand side the $\overline{MVB}$ signal on lead 21 and the monostable multivibrator stage 22. The monostable multivibrator consists of a monostable multivibrator with a constant pulse width of approximately four microseconds. Adjustment of the pulse width of the output from the monostable multivibrator 22 may be made through the network including potentiometer 60, resistor 62, and capacitor 64. The output from the monostable multivibrator stage 22 is passed through a series resistor 66 connected to the negative input terminal for the next following integrator amplifier stage 24. In the integrator amplifier stage 24, the gain is set by the resistor 66, resistor 70, and potentiometer 72. The output voltage vs. frequency curve is determined by the gain which is adjustable by the resistors of potentiometer 72. The entire curve may be raised or lowered by the offset adjustment network at the lower terminal of the integrator amplifier stage 24. Included in this network is a potentiometer 74 and fixed series resistors 76 and 78. The necessary ground connections are made through capacitors 80 as shown.

The output from the integrator amplifier stage 24 at point S is then passed to the lower input terminal of the level comparator stage 20. If the voltage at the upper input terminal of the comparator 20 becomes greater than the voltage at its lower input terminal, then the maximum current that is allowable for a particular frequency is being exceeded. The voltage output signal from the integrator amplifier 24 is the signal that tells us what the maximum current is that we can have in the particular frequency. If the voltage coming in on the upper input lead exceeds the allowable level, there will be a shut-off operation. The output from the comparator 20 will then be used to trigger the transistor drive circuit for relay 28 such that power will be interrupted from the gap. It is possible to interrupt the machining process in other ways such as by turning off the multivibrator 10. A number of systems which perform this type of operation are known to the prior art.

The present invention thus relates to an over current protection system for EDM which responds to changes in freqnency and thus to the average voltage changes which occur. At relatively low frequencies, there are few pulses per second. As the frequency increases, the pulses get closer together and the average voltage decreases in a linear fashion. Thus the control signal is the voltage output from the integrator amplifier which signal represents the maximum current at which we may cut safely at a given frequency.

It will therefore be seen that we have provided by our invention an improved over current protection circuit for an electrical discharge machining apparatus.

We claim:

1. The method of protecting an electrical discharge machining power supply circuit having a pulse generator and an output module against over current operation, comprising the steps of:
    (a) deriving from the output module a first voltage signal representative of average current of working power pulses being passed to the gap;
    (b) sensing and deriving from the pulse generator output frequency a second voltage signal as a reference representing a maximum safe level of current at each given frequency of working power pulses;
    (c) comparing said first and second voltage signals; and
    (d) interrupting the operation of the power supply responsive to said first signal being greater than said second signal.

2. The combination as set forth in claim 1 wherein the final step comprises disconnecting the power module from the machining gap.

3. The combination as set forth in claim 1 wherein step (a) above includes sensing machining power pulses by a shunt circuit.

4. The combination as set forth in claim 1 wherein step (a) above includes sensing the amplitude of gap current pulses and converting them to said first voltage signal.

5. The combination as set forth in claim 1 wherein said step (d) above comprises disconnecting said power module from the gap.

6. The combination as set forth in claim 1 wherein said step (d) above is provided through the operation of an electromagnetically controlled relay.

7. The method of protecting an electrical discharge machining power supply circuit having a pulse generator and an output module from over current operation, comprising the steps of:
    (a) deriving from the output module a first voltage signal representative of average current of pulses being passed to the gap;
    (b) sensing and deriving from the pulse generator output frequency a second voltage signal as a reference representing a maximum safe level of current at each given frequency;

(c) comparing the magnitude of said first and second voltage signals; and (d) interrupting the operation of the power supply responsive to said first signal being more negative than said second signal.

8. An over current protection system for an EDM apparatus including a pulse generator and an output module connected to the gap, comprising:

means for sensing the output of the output module;

means for deriving from said output a first voltage signal representative of the average current of pulses being passed to the gap;

a frequency to voltage converter means operably connected to the pulse generator output for providing a second voltage signal as a reference representative of a maximum safe level of current at each given frequency;

means for comparing the magnitude of said first and second voltage signals; and means for interrupting the operation of said EDM apparatus responsive to a predetermined difference between said signals.

9. The combination as set forth in claim 8 wherein said means for sensing the output of the output module comprises an ammeter shunt circuit.

10. The combination as set forth in claim 8 wherein said means for deriving comprises an integrator amplifier stage.

11. The combination as set forth in claim 8 wherein said pulse generator includes a multivibrator and said frequency to voltage converter means for providing said second voltage signal comprises successive stages of a monostable multivibrator and an integrator amplifier coupled to its output.

12. The combination as set forth in claim 8 wherein a further gain adjust means is operably coupled to said means for deriving said first voltage signal, said gain adjust means operable to lower the gain responsive to higher current level machining.

13. The combination as set forth in claim 8 wherein said means for interrupting comprises a disconnect means operably connected to the output module for turning it off.

14. The combination as set forth in claim 13 wherein said disconnect means is operably connected to said pulse generator for turning it off.

* * * * *